United States Patent [19]

Miller

[11] Patent Number: 5,801,921
[45] Date of Patent: Sep. 1, 1998

[54] INTEGRATED DATA, VOICE, AND VIDEO COMMUNICATION NETWORK

[75] Inventor: Steven K. Miller, Indianapolis, Ind.

[73] Assignee: Symex, Inc., Indianapolis, Ind.

[21] Appl. No.: 754,505

[22] Filed: Nov. 19, 1996

[51] Int. Cl.[6] .................. G06F 1/16; H05K 5/02
[52] U.S. Cl. .................. 361/686; 361/727; 174/72 A
[58] Field of Search .................. 361/683, 686, 361/724–727; 174/72 A, 69, DIG. 9; 439/623, 502, 49; 364/708.1; G06F 1/16

[56] References Cited

U.S. PATENT DOCUMENTS

| | | |
|---|---|---|
| 3,755,716 | 8/1973 | Yoshii . |
| 4,131,330 | 12/1978 | Stupay . |
| 4,138,718 | 2/1979 | Toke et al. .................. 364/200 |
| 4,150,867 | 4/1979 | Knickerbocker . |
| 4,160,880 | 7/1979 | Brey . |
| 4,217,023 | 8/1980 | Petit et al. . |
| 4,326,107 | 4/1982 | Perna . |
| 4,533,195 | 8/1985 | Knickerbocker . |
| 4,536,052 | 8/1985 | Baker et al. . |
| 4,752,107 | 6/1988 | Gunell et al. . |
| 4,761,811 | 8/1988 | Zetena, Jr. . |
| 4,766,521 | 8/1988 | Pelletier . |
| 4,797,124 | 1/1989 | Beaulieu et al. . |
| 4,829,564 | 5/1989 | Jarvis . |
| 4,970,722 | 11/1990 | Preschutti .................. 370/94.3 |
| 5,208,737 | 5/1993 | Miller . |
| 5,237,566 | 8/1993 | Brand et al. .................. 370/61 |
| 5,241,136 | 8/1993 | Michaelis et al. . |
| 5,307,243 | 4/1994 | Sharp et al. . |
| 5,326,934 | 7/1994 | LeMaster et al. . |
| 5,422,946 | 6/1995 | Delakowitz et al. . |
| 5,432,907 | 7/1995 | Picazo, Jr. et al. .................. 395/200 |
| 5,460,441 | 10/1995 | Hastings et al. .................. 312/298 |
| 5,548,280 | 8/1996 | Pearce .................. 340/825.05 |
| 5,604,662 | 2/1997 | Anderson et al. .................. 361/685 |
| 5,645,434 | 7/1997 | Leung .................. 439/74 |

*Primary Examiner*—Lynn D. Feild
*Attorney, Agent, or Firm*—Maginot, Addison & Moore

[57] ABSTRACT

A communication network assembly includes a cabinet having a first set of connectors secured thereto. The assembly further includes a main processing system supported within the cabinet, the main processing system including a plurality of circuit card slots. In addition, the assembly includes a network hub supported within the cabinet. The assembly also includes a wiring harness supported within the cabinet which connects the main processing system and the network hub to the first set of connectors, the wiring harness further connects the main processing system to the network hub. Moreover, the assembly includes a main distribution frame having a second set of connectors secured thereto. Also, the assembly includes a cable harness having a third set of connectors and a fourth set of connectors, the third set of connectors being connected to the first set of connectors, and the fourth set of connectors being connected to the second set of connectors.

20 Claims, 9 Drawing Sheets

INTEGRATED DATA, VOICE, AND VIDEO COMMUNICATION NETWORK

BACKGROUND OF THE INVENTION

Cross reference is made to copending U.S. patent application Ser. Nos. 08/754,508, entitled "Equipment Cabinet for Components of a Communication Network Assembly" by Steven K. Miller and Ser. No. 08/754,513, entitled "Method of Installing an Integrated Data, Voice, and Video Communication Network" by Steven K. Miller, both of which are assigned to the same assignee as the present invention, and both of which are filed concurrently herewith.

The present invention relates generally to integrated data, voice, and video communication networks, and more particularly to an integrated data, voice, and video communication network which can be easily and quickly installed at an installation site without a substantial amount of interference to a customer's operation or business.

Many work areas, such as offices, include data, voice, and video communication networks. Such networks typically include a data communication network (e.g. a local area network, LAN), a telephone or voice communication network, and a video conferencing network. As is well known in the art, a LAN may include a group of computers and other devices dispersed over a relatively limited area which are connected by a communications link that enables any device to interact with any other device on the network. LANs commonly include computers, printers, and data storage devices.

A number of different network servers may be used within a LAN environment. For example, a LAN may include a file and a print server for storage, sharing, and printing of files, along with other functions, such as electronic messaging. A LAN may also include a communication server which functions as a gateway that translates data within the LAN into asynchronous signals, such as those used by a modem for the transmittal of data across a telephone line. A LAN may also include other network servers such as Internet servers, applications servers, and video servers.

The telephone network installed in many offices typically includes a computer and associated software functioning as a telephony server. The telephony server may be configured to function as a private branch exchange (PBX) wherein various types of data terminals, telephones and expansion modules are connected to a central hardware component such as a key service unit (KSU) which has a processor and memory, and which provides a physical point for connection of the various types of data terminals, telephones, and expansion modules. The telephony server may also provide additional features such as voice mail and facsimile capabilities.

Figure 1:
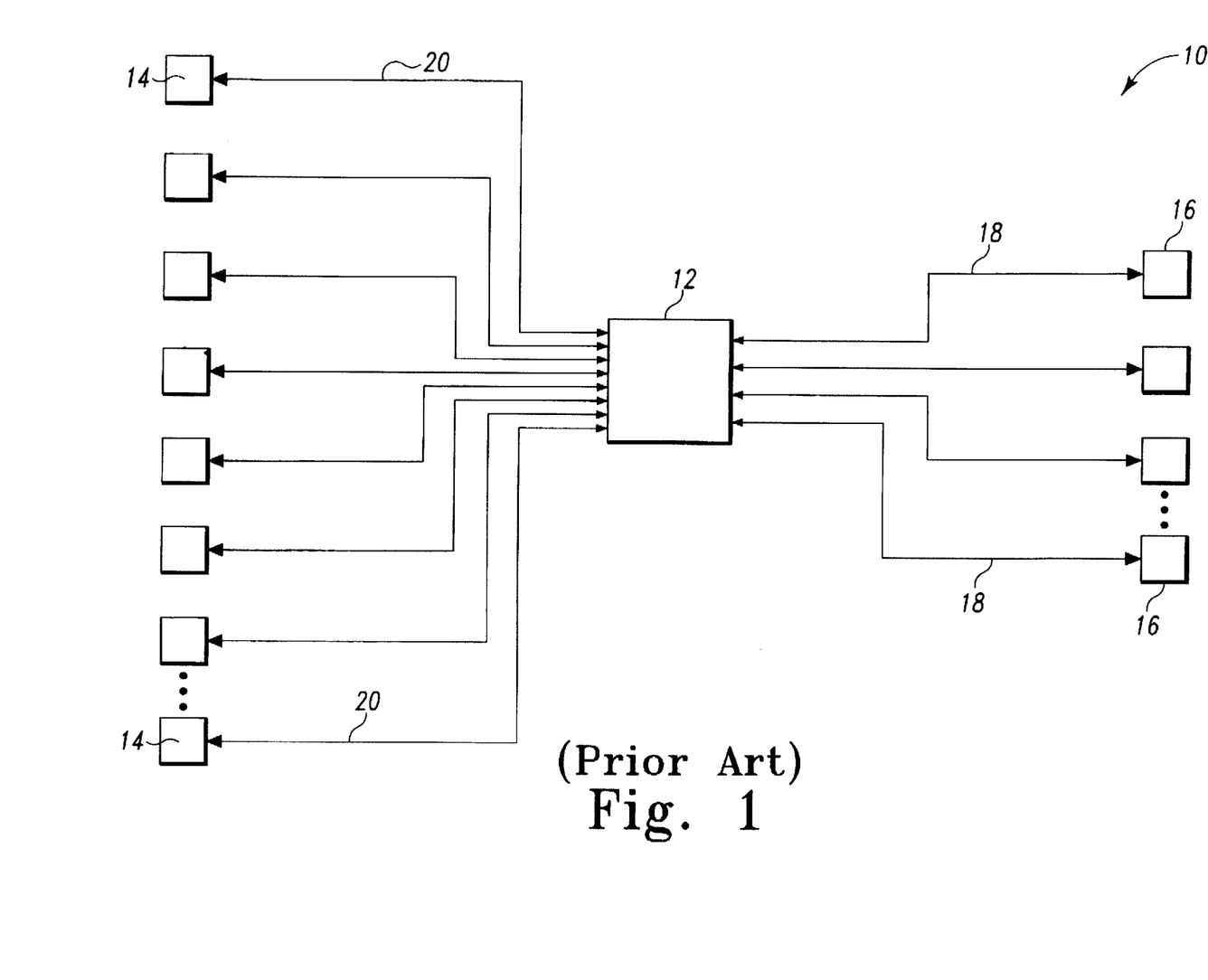
FIG. 1 is a block diagram of an exemplary prior art data, voice, and video communication network.

A typical prior art data, voice, and video communication network 10 is shown in FIG. 1. The data, voice, and video communication network 10 includes a main distribution frame 12 which connects a number of network devices 16 to a number of workstations 14. The network devices 16 may include known computers, and associated software therewith, functioning as known LAN servers, telephony or PBX servers, file and print servers, video servers, Internet servers, etc. Each of the network devices 16 is provided as a separate device in a separate housing and is connected to the main distribution frame 12 via one or more communication lines 18. The workstations 14 may include personal computers (PCs), data terminals, laser printers, telephones, and facsimile machines. Each of the workstations 14 is connected to the main distribution frame 12 via one or more data and telecommunication lines 20.

In order to install the data, voice, and video communication network 10, the data and telecommunication lines 20 are routed through the walls, ceilings, floors, and conduit of a building and terminated in a large central area which contains the main distribution frame 12. This central area is typically a closet or remote area of the office which is large enough to house the numerous computers, monitors, keyboards, and other devices included in the data, voice, and video communication network 10. Once installed, each of the data and telecommunication lines 20 is connected at a first end to a predetermined location on the main distribution frame 12, and at a second end to a respective workstation 14.

Thereafter, each of the network devices 16 is physically placed in the central area and separately coupled to the main distribution frame 12 via the communication lines 18. Once connected to the main distribution frame 12, software is then typically installed onto the network devices 16. The network devices 16 are then configured so as to be compatible with each other. After which, a verification operation is performed so as to be certain that the software has been properly loaded onto the network devices 16 and that the network devices 16 have been properly configured. After the verification operation is performed, the data, voice, and video communication network 10 is rendered operational. It may take a technician several hours or even days to load all of the necessary software, configure each of the individual network devices 16, and perform the verification operation. Such a large amount of time may be highly intrusive to a customer's operation or business.

Hence, as described above, prior art data, voice, and video communication networks disadvantageously require a large amount of physical office space in order to position and arrange each of the separate network devices which are components of the data, voice, and video communication network. Further, prior art integrated data, voice, and video communication networks disadvantageously require a substantial amount of time at an installation site to install, configure, and verify.

What is needed therefore is an integrated data, voice, and video communication network which can be easily and quickly installed at an installation site without a substantial amount of interference to the customer's operation or business. What is also needed is an integrated data, voice, and video communication network which can be installed in a relatively small amount of physical office space.

SUMMARY OF THE INVENTION

In accordance with one embodiment of the present invention, there is provided a communication network assembly which includes a cabinet having a first set of connectors secured thereto. The assembly further includes a main processing system supported within the cabinet, the main processing system including a plurality of circuit card slots. The assembly also includes a network hub supported within the cabinet. The assembly additionally includes a wiring harness supported within the cabinet which connects the main processing system and the network hub to the first set of connectors, the wiring harness further connects the main processing system to the network hub. Moreover, the assembly also includes a main distribution frame having a second set of connectors secured thereto. Also, the assembly includes a cable harness having a third set of connectors and a fourth set of connectors, the third set of connectors being connected to the first set of connectors, and the fourth set of connectors being connected to the second set of connectors.

In accordance with a second embodiment of the present invention, there is provided a communication network assembly including a cabinet having a first set of connectors secured thereto. The assembly further includes a plurality of network devices supported within the cabinet. In addition, the assembly includes a wiring harness supported within the cabinet which connects the plurality of network devices to the first set of connectors, the wiring harness further connects the plurality of network device to each other. The assembly further includes a main distribution frame having a second set of connectors secured thereto. Moreover, the assembly includes a cable harness having a third set of connectors and a fourth set of connectors, the third set of connectors being connected to the first set of connectors, and the fourth set of connectors being connected to the second set of connectors.

It is therefore an object of the present invention to provide a new and useful integrated data, voice, and video communication network.

It is another object of the present invention to provide an improved integrated data, voice, and video communication network.

It is yet another object of the present invention to provide an integrated data, voice, and video communication network which can be easily and quickly installed at an installation site without a substantial amount of interference to the customer's operation or business.

It is moreover an object of the present invention to provide an integrated data, voice, and video communication network which can be installed in a relatively small amount of physical office space.

The above and other objects, features, and advantages of the present invention will become apparent from the following description and the attached drawings.

DETAILED DESCRIPTION OF THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
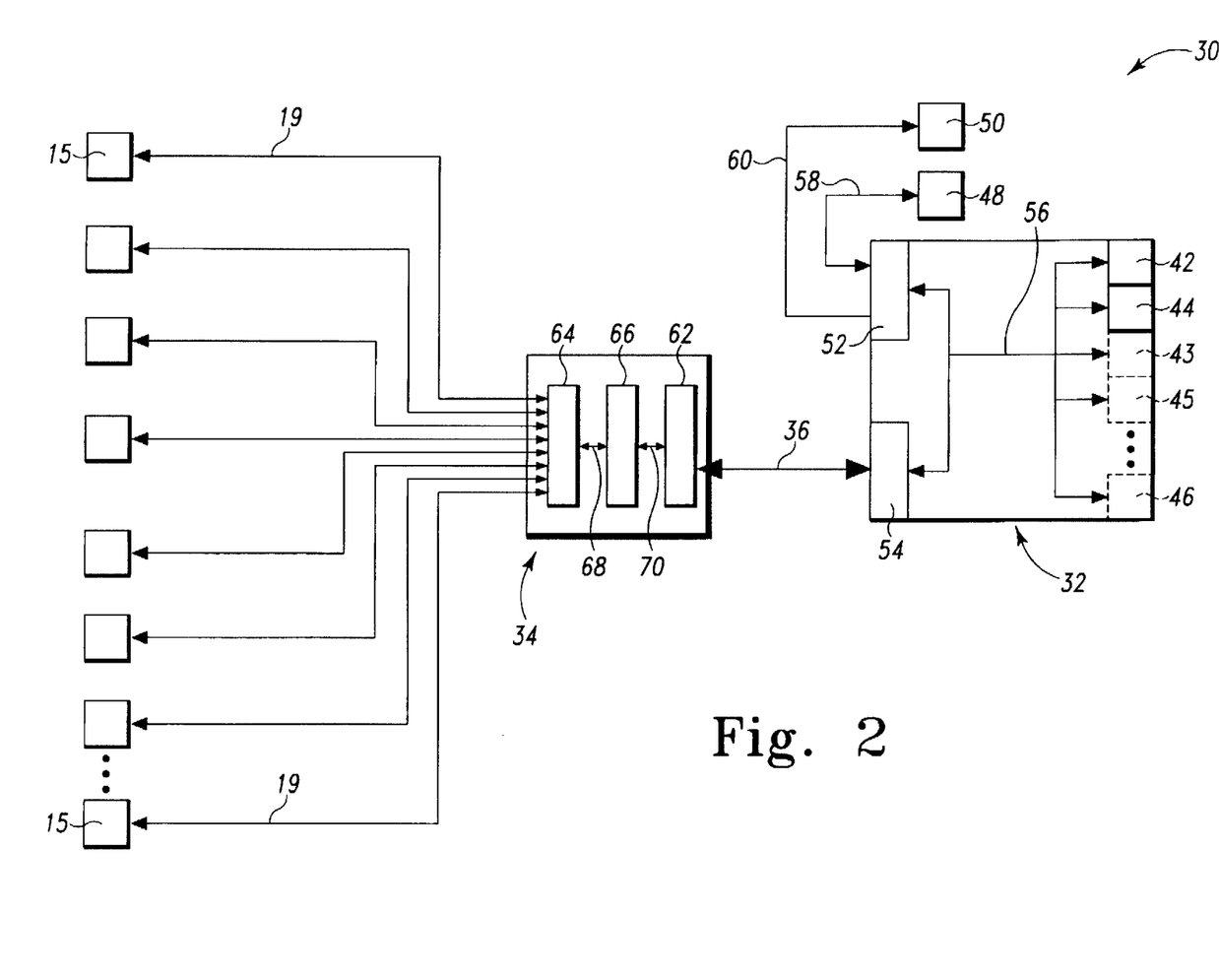
FIG. 2 is a block diagram of an integrated data, voice, and video communication network which incorporates the features of the present invention therein.

Referring now to FIG. 2, there is shown a block diagram of an integrated data, voice, and video communication network 30 which incorporates the features of the present invention therein. The integrated data, voice, and video communication network 30 includes an equipment cabinet 32, a main distribution frame 34, and a cable harness 36.

The equipment cabinet 32 supports a number of network devices such as a main processing system 42, a network hub 44, an external data storage device 48, and a display monitor 50. The equipment cabinet 32 may be alternatively configured with an expansion processing system 43 and additional network hubs 45 and 46 installed therein. Note that FIGS. 3, 4, 7, and 8 do not show the expansion processing system 43 and the additional network hubs 45 and 46.

The equipment cabinet 32 further includes an upper distribution panel 52, a lower distribution panel 54, and a wiring harness 56. The wiring harness 56 connects a keyboard 38 (see FIG. 7), a mouse 40 (see FIG. 7), the main processing system 42, the expansion processing system 43 (if installed), the network hub 44, the additional network hubs 45 and 46 (if installed), the upper distribution panel 52, and the lower distribution panel 54 together.

The external data storage device 48 and the display monitor 50 are connected to the upper distribution panel 52 via conventional cabling 58 and 60, respectively. The main distribution frame 34 is connected to the lower distribution panel 54 via the cable harness 36.

The main distribution frame 34 serves as a distribution center from which data, voice, and/or video signals are routed between the equipment cabinet 32 and a number of workstations 15 which may include computing and/or telecommunications devices. In particular, the main distribution frame 34 includes a distribution panel 62 having the cable harness 36 connected thereto. The main distribution frame 34 further includes a number of known connector blocks which are organized into a first group of connector blocks 64 and a second group of connector blocks 66.

Similar to the workstations 14 of the data, voice, and video communication network 10 shown in FIG. 1, the workstations 15 may include personal computers (PCs), data terminals, laser printers, telephones, and facsimile machines. The workstations 15 are connected to the main distribution frame 34 via one or more data and telecommunication lines 19. In particular, the data and telecommunication lines 19 are typically routed through walls, ceilings, floors, and conduit of an installation site, and are terminated to terminals of the first group of connector blocks 64. What is meant herein by the term "installation site" is an office or building location where the integrated data, voice, and video communication network 30 is installed and subsequently located during operation thereof.

A number of first cross-connect or jumper wires 68 extend between the terminals of the first group of connector blocks 64 and terminals of the second group of connector blocks 66. A number of second cross-connect or jumper wires 70 extend between the distribution panel 62 and the terminals of the second group of connector blocks 66. As a result, electrical pathways are established which permit the network devices housed in the equipment cabinet 32 to communicate with the workstations 15.

Figure 3:
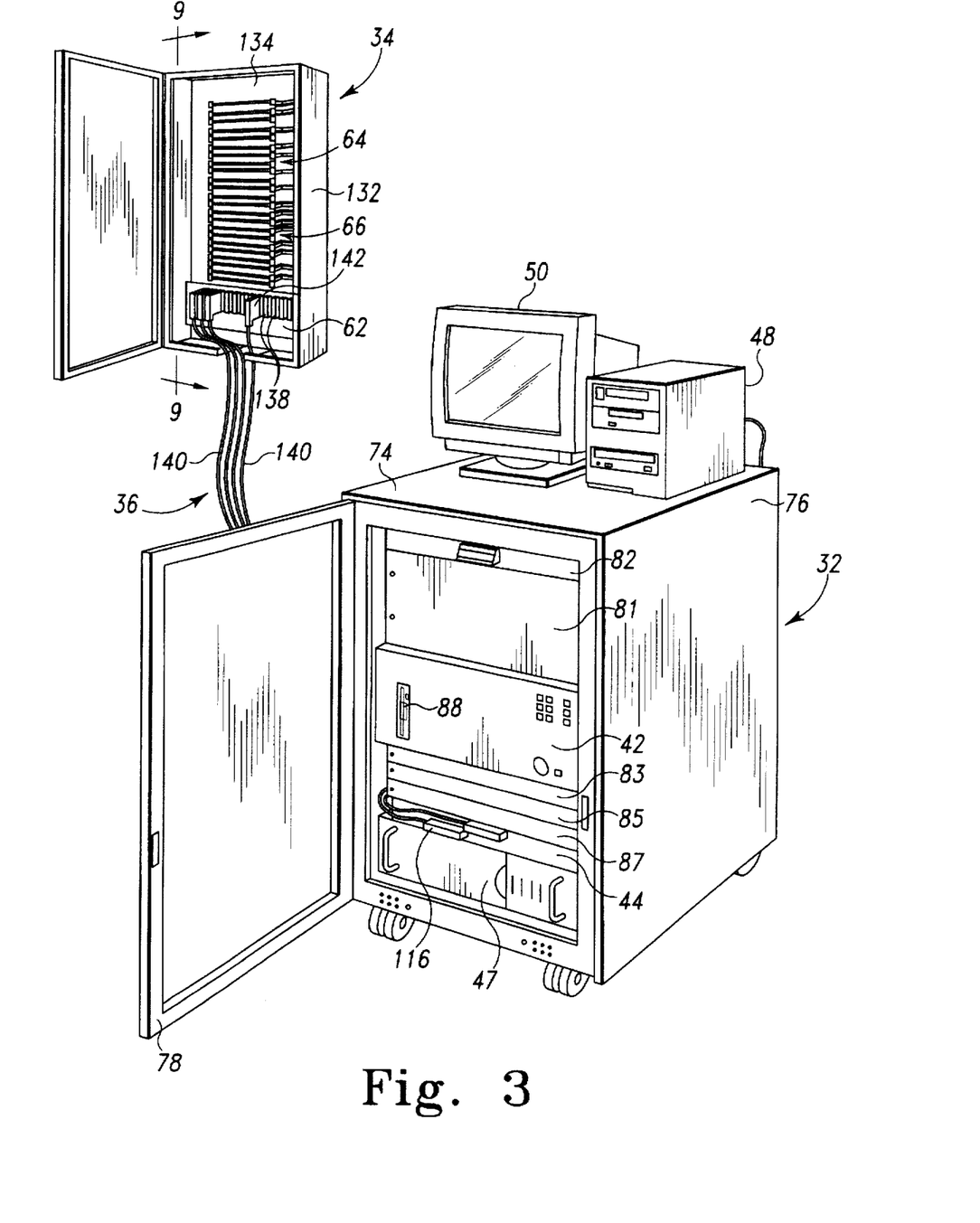
FIG. 3 is a perspective view of the integrated data, voice, and video communication network of FIG. 2.
Figure 4:
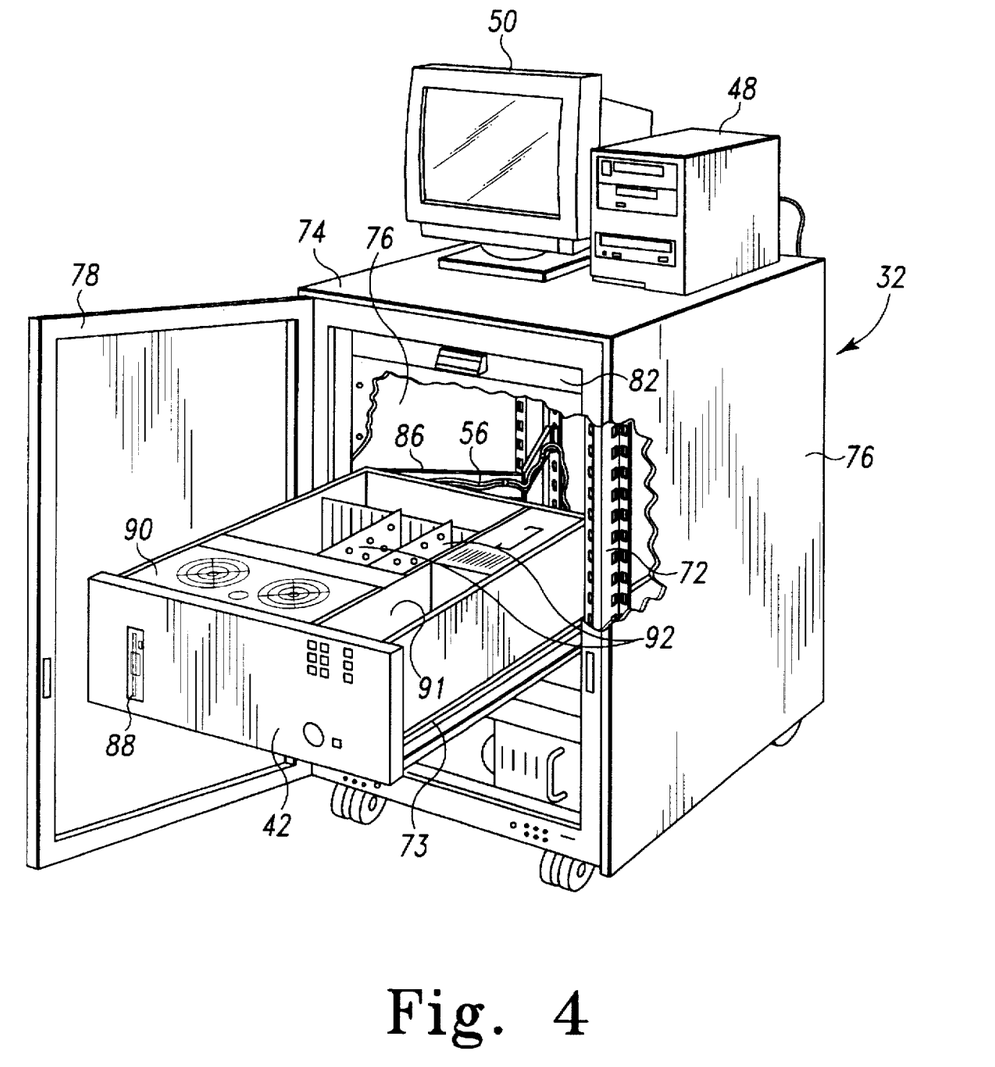
FIG. 4 is a fragmentary perspective view of an equipment cabinet containing components of the integrated data, voice, and video communication network of FIG. 3 having a main processing system shown in an outwardly extended position.
Figure 5:
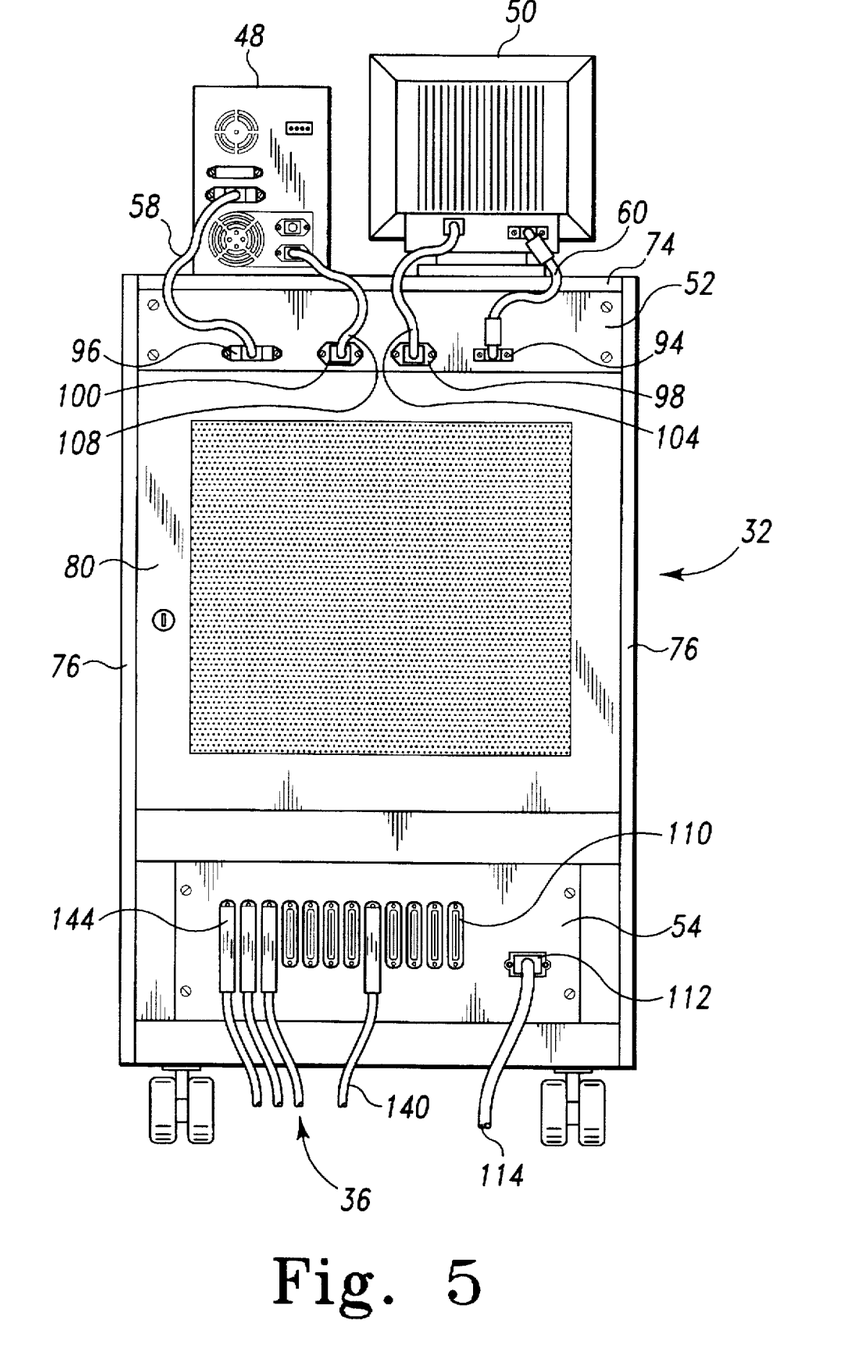
FIG. 5 is a rear elevational view of the equipment cabinet of FIG. 3.

Referring now to FIGS. 3–5, there is shown the integrated data, voice, and video communication network 30 of FIG. 2. The equipment cabinet 32 includes a frame 72 (see FIG. 4), a top panel 74, two removable side panels 76, a front door 78, a rear door 80 (see FIG. 5), and a storage drawer 82. The equipment cabinet 32 supports the main processing system 42, the network hub 44, a power supply 47, the external data storage device 48, and the display monitor 50. The external data storage device 48 may be an integrated tape backup device and CD ROM drive.

A number of cover panels 81, 83, 85, and 87 are secured to the frame 72. The cover panel 81 may be removed thereby allowing for the expansion processing system 43, which is similar to the main processing system 42, to be installed in the equipment cabinet 32. Moreover, the cover panels 85 and 87 may be removed thereby allowing for the network hubs 45 and 46, which are similar to the network hub 44, to be installed in the equipment cabinet 32. In addition, the cover panel 83 may be removed in order to install an additional network device, such as a high-speed video switch (not shown) within the equipment cabinet 32.

The main processing system 42, the network hub 44, and the power supply 47 are rack-mounted to the frame 72 using known rack-mounting hardware. For example, as shown in FIG. 4, the main processing system 42 is slidably mounted to the frame 72 via a number of slide brackets 73. An articulating cable support arm 86 is coupled at a first end to the frame 72, and coupled at a second end to the rear of the main processing system 42. The wiring harness 56, which electrically couples the main processing system 42 to the other network devices associated with the equipment cabinet 32 and to the main distribution frame 34, is secured to the articulating cable support arm 86 to prevent the wiring harness 56 from becoming entangled as the main processing system 42 is slid into and out of the equipment cabinet 32. More specifically, when the main processing system 42 is in a first or inwardly retracted position, as seen in FIG. 3, the articulating cable support arm 86 is positioned in a first or collapsed orientation. However, when the main processing system 42 is positioned in a second or outwardly extended position, as seen in FIG. 4, the articulating cable support arm 86 is positioned in a second or extended orientation. It should be appreciated that the expansion processing system 43 and the network hubs 45 and 46 are mechanically and electrically coupled in a manner similar to the main processing system 42 and the network hub 44, respectively, when installed in the equipment cabinet 32.

The main processing system 42 includes a backplane (not shown). The backplane and associated hardware, which include known circuit card slots (not shown), receive one or more circuit cards 92 in a conventional manner. The circuit cards 92 and associated software (collectively referred to hereinafter simply as "circuit cards"), may individually or cooperatively define a number of commercially available network servers such as a file and print server, a communications server, a telephony server, an application server, an Internet server, and/or a video server. It should be appreciated that a given circuit card 92 may cooperate with a data storage device included in the equipment cabinet 32, such as a known hard disk drive (not shown), in order to store the software associated with the operation of the circuit card 92. For example, each of the servers may include (1) a processor card, such as a 486DX4-100MHz or a P5-120MHz processor card which are commercially available from Cubix International (hereinafter referred to as "Cubix") of Carson City, Nev., (2) an operating system software package such as Netware version 4.11 or Windows NTAS version 4.0 which are commercially available from Novell Incorporated (hereinafter referred to as "Novell") of Provo, Utah and Microsoft Corporation (hereinafter referred to as "Microsoft") of San Ramon, Calif., respectively, (3) a hard disk drive, such as a 4.2 gigabyte hard disk drive which is commercially available from Seagate Incorporated (hereinafter referred to as "Seagate") of Scotts Valley, Calif., and (4) a server-specific application software package such as those listed in the following table:

| Type of Server | Server-Specific Application Software |
| --- | --- |
| File and Print | GroupWise[1], Managewise[1], MS Exchange Server[2], MS Remote Access[2], Arcserve[3], Faxserve[3], |
| Communications | Netware Connect[1], MS Windows NTAS RAS[2] |
| Telephony | Netware Telephony Server[1] |
| Application | SQL Server[2] |
| Internet | Netware WEB Server[1], MS Internet Server[2] |
| Video | ProShare[4] |

[1]Commercially available from Novell.
[2]Commercially available from Microsoft.
[3]Commercially available from Cheyenne Corporation of Lake Success, New York.
[4]Commercially available from Intel Corporation (hereinafter referred to as "Intel") of American Fork, Utah.

In addition, one of the circuit cards 92 may be a known management console card, thereby providing for remote management of the integrated data, voice, and video communication network 30 via a telephone line connection. Hence, a system administrator may be located at a remote location, (i.e. an area or office removed from the installation site) and troubleshoot or otherwise control the integrated data, voice, and video communication system 30 via a telephone line connection. An example of a suitable management console card includes LanDesk 2.5 and Windows 95 software, which are commercially available from Intel and Microsoft, respectively, installed on a 1.0 gigabyte hard disk drive which is available from Seagate, and operated on a 486DX4-100MHz processor card which is available from Cubix.

The main processing system 42 can accommodate the required number of circuit cards 92 for up to four network servers. If a particular integrated data, voice, and video communication network 30 requires additional network servers, the cover panel 81 may be removed and the expansion processing system 43 installed in the equipment cabinet 32, thereby adding the capability for an additional four network servers. In addition, the equipment cabinet 32 may include a connector (not shown) which allows the equipment cabinet 32 to be electrically coupled to additional equipment cabinets, similar to the equipment cabinet 32, thereby further increasing the number of network servers that the integrated data, voice, and video communication network 30 may support.

The main processing system 42 further includes a fan unit 90. Disposed below the fan unit 90 is a number of hard disk drives (not shown). The hard disk drives function to satisfy the data storage requirements associated with the operation of the various network servers. In addition, the main processing system 42 includes a floppy disk drive 88 for loading software onto or downloading files from the various network devices.

The main processing system 42 further includes an expansion bay 91. A backup power supply (not shown) may be added to the expansion bay 91, thereby providing backup power to the main processing system 42 in the event the power supply 47 is rendered inoperative.

The network hub 44 may be a conventional Ethernet hub which provides local area network (LAN) connections to a number of computers or workstations, such as the workstations 15 of FIG. 2. The network hub 44 may support up to 24 computers. With the network hubs 45 and 46 also operatively mounted in the equipment cabinet 32, up to 64 computers may be supported with eight (8) LAN connections being reserved for use within the equipment cabinet 32. As mentioned above, the equipment cabinet 32 may include a connector (not shown) which allows the equipment cabinet 32 to be electrically coupled to additional equipment cabinets, similar to the equipment cabinet 32, thereby further increasing the number of LAN connections that the integrated data, voice, and video communication network 30 may support. A suitable Ethernet hub is a model number 3C16672 24-port Telco Ethernet Hub commercially available from 3Comm Corporation of Santa Clara, Calif.

The power supply 47 may be a conventional uninterruptible power supply which provides power to the network devices associated with the equipment cabinet 32 such as the main processing system 42 and the network hub 44. An example of a suitable uninterruptible power supply which may be used with the present invention is a model number SU1400RM which is commercially available from American Power Conversion of West Kingston, R.I.

The external data storage device 48 and the display monitor 50 are supported on the top panel 74 of the equipment cabinet 32. As shown in FIG. 5, the upper distribution panel 52 includes a first data connector 94, a second data connector 96, a first power connector 98 and a second power connector 100. The data connector 94 mates with a connector attached to the data cable 60 from the display monitor 50. The power connector 98 mates with a connector attached to a power cord 104 from the display monitor 50. The data connector 96 mates with a connector attached to the data cable 58 from the external data storage device 48. The power connector 100 mates with a connector attached to a power cord 108 from the external data storage device 48.

The data connectors 94 and 96 couple the display monitor 50 and the external data storage device 48, respectively, to the network devices associated with the equipment cabinet 32. In particular, the data connector 94, and therefore the display monitor 50, are coupled to the main processing system 42 via the wiring harness 56, whereas the data connector 96, and therefore the external data storage device 48, are coupled to the main processing system 42 via a known small computer system interface (SCSI) cable. The power connectors 98 and 100 couple the display monitor 50 and the external data storage device 48, respectively, to the power supply 47 via a pair of power cables (not shown) within the equipment cabinet 32.

The lower distribution panel 54 includes a plurality of data connectors 110 and a power connector 112. The data connectors 110 receive the cable harness 36, whereas the power connector 112 mates with a connector attached to a power cord 114 which plugs into a standard 110V AC outlet (not shown). The power connector 112 couples the 110V AC outlet to the power supply 47, and therefore the network devices associated with the equipment cabinet 32.

The plurality of data connectors 110 and the power connector 112 of the lower distribution panel 54 collectively define a first set of connectors. Moreover, the first data connector 94, the second data connector 96, the first power connector 98, and the second power connector 100 of the upper distribution panel 52 collectively define a second set of connectors.

Figure 6:
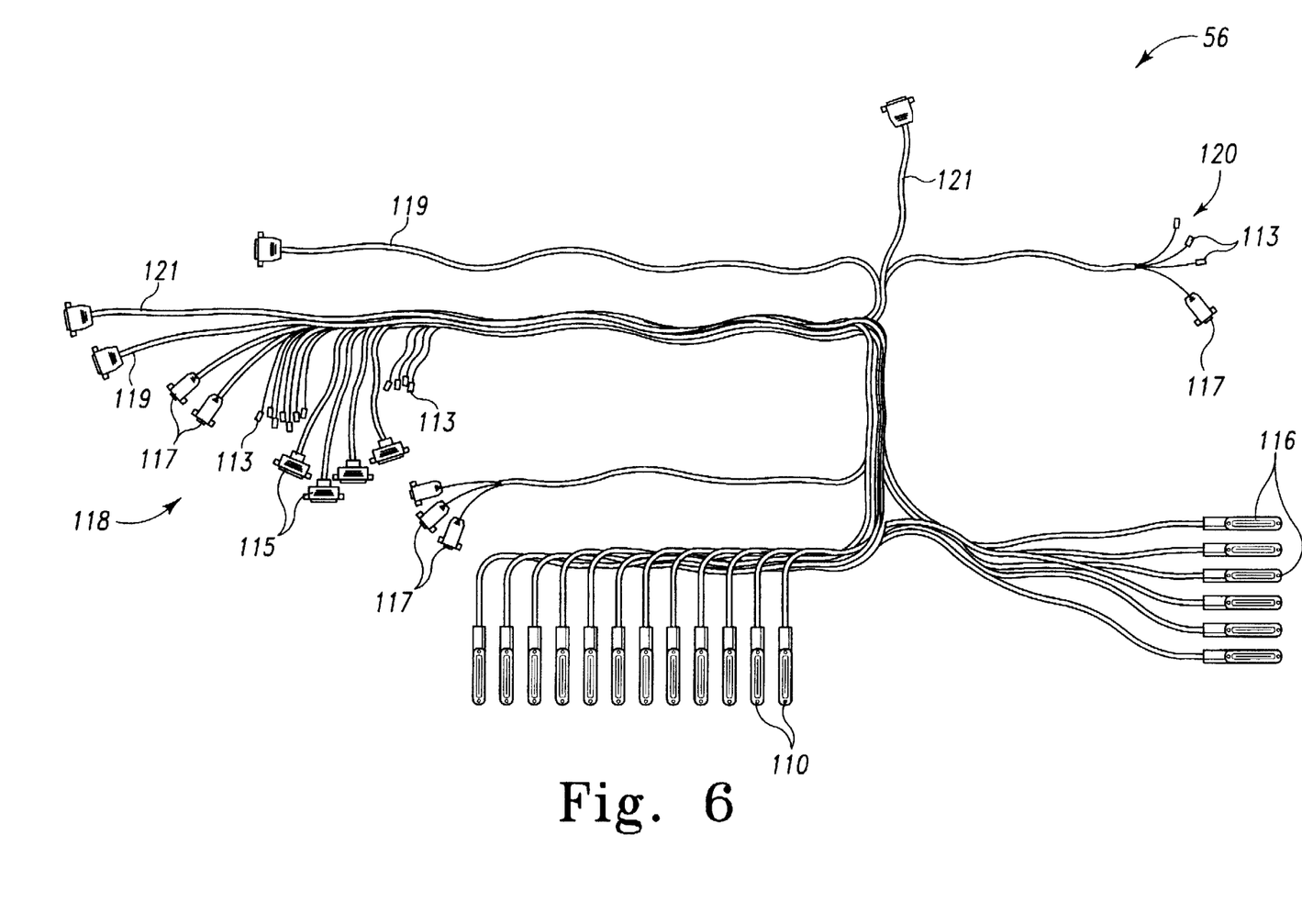
FIG. 6 is a plan view of a wiring harness of the integrated data, voice, and video communication network of FIG. 3 (note: the wiring harness is shown removed from the equipment cabinet for clarity of description)

Referring now to FIG. 6, there is shown the wiring harness 56 which connects the keyboard 38 (see FIG. 7), the mouse 40 (see FIG. 7), the main processing system 42 (see FIG. 3), the expansion processing system 43 (if installed), the network hub 44 (see FIG. 3), the additional network hubs 45 and 46 (if installed), the upper distribution panel 52 (see FIG. 5), and the lower distribution panel 54 (see FIG. 5) together. The wiring harness 56 includes a plurality of data cables, telephone cables, and video cables which have known connectors such as RS-232 connectors and RJ-11 connectors secured thereto, and which are bundled together to form the wiring harness 56.

A plurality of data connectors 116 are provided for connection to the network hub 44 mounted to the equipment cabinet 32. More specifically, two data connectors 116 connect to the network hub 44 as shown in FIG. 3, with the additional four data connectors 116 being used to connect the additional network hubs 45 and 46 when installed in the equipment cabinet 32.

A data cable group 118 is coupled to the main processing system 42 and the expansion processing system 43 (if installed). In particular, the data cable group 118 includes a plurality of cables 113 which may be used for known voice mail, modem, and Ethernet connections. In addition, the data cable group 118 includes a plurality of cables 115 which provide for telephony (e.g. PBX) connections. Moreover, the data cable group 118 includes a number of control cables 117 which are coupled at a first end thereof to the main processing system 42. The control cables 117 are coupled at a second end thereof to the power supply 47 thereby allowing the main processing system 42 to control the power supply 47. The data cable group 118 further includes a cable 119 which couples at a first end thereof to the main processing system 42 and at a second end thereof to the expansion processing system 43 (if installed) thereby functioning as an interconnection between the main processing system 42 and the expansion processing system 43.

A data cable group 120 functions as a "swing" cable group. That is, the data cable group 120 may be coupled to either the main processing system 42 or the expansion processing system 43 (if installed), depending on the configuration of a given integrated data, voice, and video communication network 30. The data cable group 120 includes additional voice mail, modem, and Ethernet cables 113. Moreover, the data cable group 120 includes a first end of a control cable 117 which is coupled to either the main processing system 42 or the expansion system 43. The control cable 117 is coupled at a second end thereof to the power supply 47 thereby allowing the main processing system 42 or the expansion processing system 43 (depending on to which the data cable group 120 is coupled) to control the power supply 47.

Moreover, the wiring harness 56 includes a data cable 121. The data cable 121 is coupled at a first end to the main processing system 42, and at a second end to a known multiplexer (not shown). Also coupled to the multiplexer are the keyboard 38 (see FIG. 7), the mouse 40 (see FIG. 7), and a data line (not shown) coupled to the data connector 94 (see FIG. 5) and therefore to the display monitor 50. Hence, the keyboard 38, the mouse 40, and the display monitor 50 are electrically coupled to the main processing system 42 via an electrical path which includes the multiplexer and the data cable 121.

Figure 7:
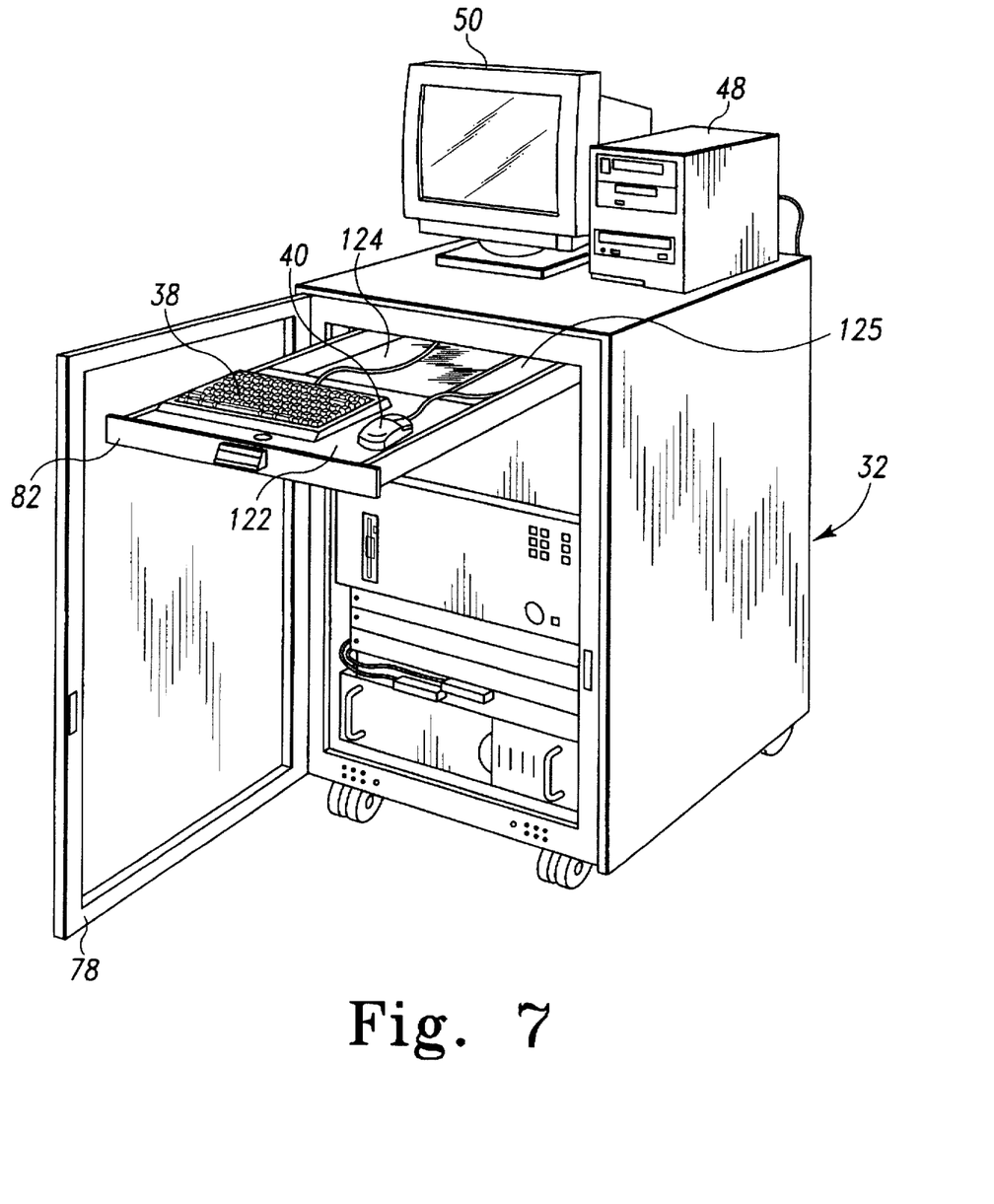
FIG. 7 is a perspective view of the equipment cabinet of FIG. 3 having a storage drawer shown in an outwardly extended position.
Figure 8:
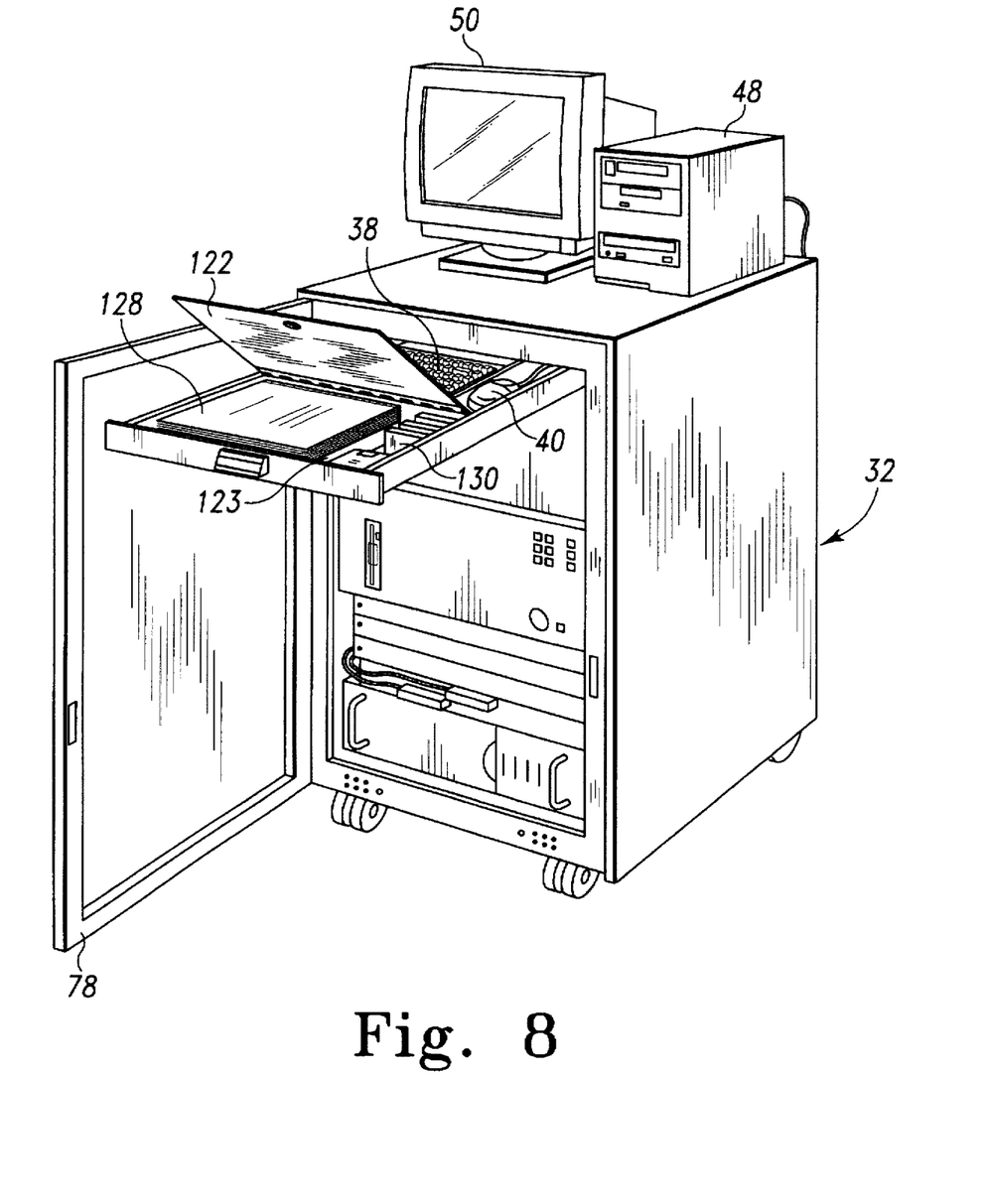
FIG. 8 is a view similar to FIG. 7, but showing a writing surface of the storage drawer shown in an upwardly pivoted position.

Referring now to FIGS. 7 and 8, there is shown the storage drawer 82 which is slidably secured to the frame 72 (see FIG. 4). The storage drawer 82 includes a writing surface 122, a first storage compartment 123, a second storage compartment 124, and a third storage compartment 125. The writing surface 122 is pivotally mounted over the first storage compartment 123, whereas the second storage compartment 124 and the third storage compartment 125 are positioned behind the first storage compartment 123.

When the writing surface 122 is pivoted upwardly as shown in FIG. 8, a user may access a system administration manual 128 and/or a number of backup tapes or disks 130 which may be stored in the first storage compartment 123. Moreover, additional items, such as a known tape or disk drive cleaning unit, may be stored in the first storage compartment 123.

Alternatively, when the writing surface 122 is not pivoted upwardly as shown in FIG. 7, the writing surface 122 may be used to support the keyboard 38 and/or the mouse 40 which are removed from the second storage compartment 124 and third storage compartment 125, respectively. Alternatively, the keyboard 38 and/or the mouse 40 may be left in the second storage compartment 124 and third storage compartment 125, respectively, and the writing surface 122 may be used to support a user's hands or arms when entering data via the keyboard 38 or the mouse 40.

Figure 9:
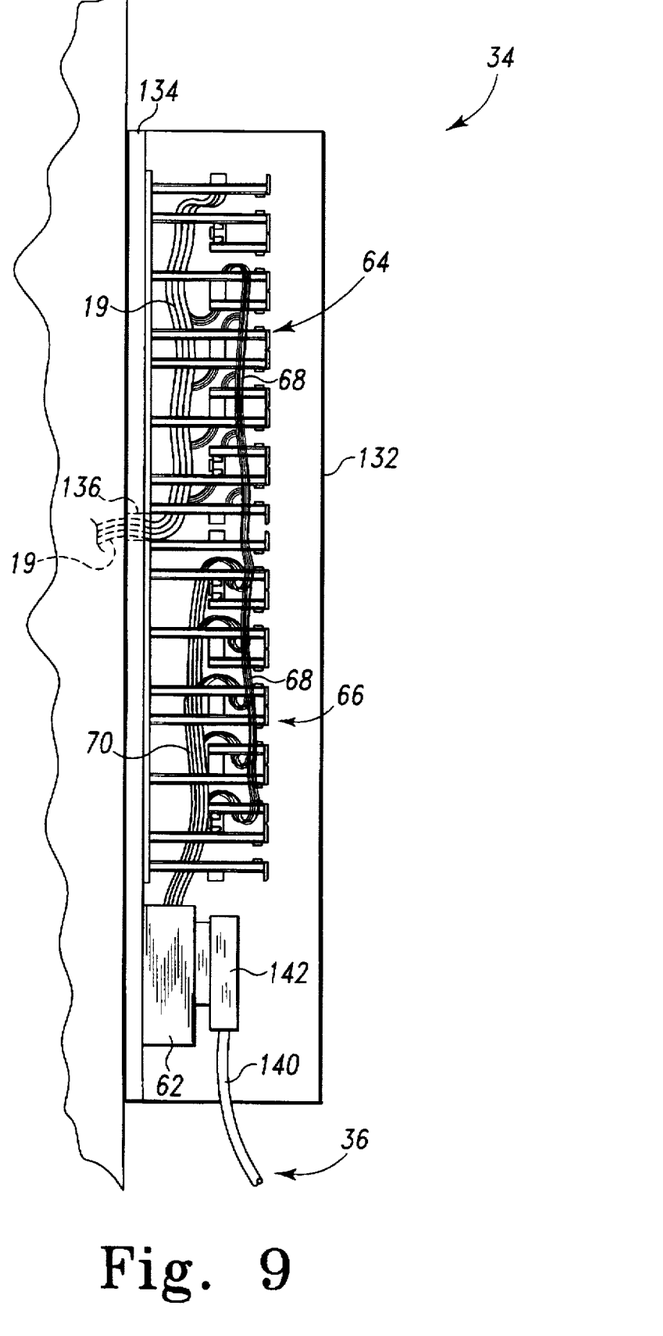
FIG. 9 is a side elevational view of a main distribution frame of the integrated data, voice, and video communication network taken along the line 9—9 of FIG. 3, as viewed in the direction of the arrows.

FIG. 9 is a side elevational view of the main distribution frame 34 taken along the line 9—9 in FIG. 3. The main distribution frame 34 includes a cabinet enclosure 132 having a back panel 134 to which the distribution panel 62 and the connector blocks 64 and 66 are mounted. The back panel 134 includes an aperture 136 for receiving the data and telecommunication lines 19 from the workstations 15. As previously mentioned, the data and telecommunication lines 19 are terminated at the connector blocks 64. Jumper wires 68 connect the connector blocks 64 to the connector blocks 66, and jumper wires 70 connect the connector blocks 66 with a set of connectors 138 (see FIG. 3) associated with the distribution panel 62.

The cable harness 36 includes a plurality of communication cables 140, such as 25-pair Telco cables, each having a first connector 142 mated to one of the connectors 138 (see FIG. 3) on the distribution panel 62, and a second connector 144 (see FIG. 5) mated to one of the connectors 110 associated on the lower distribution panel 54 (see FIG. 5). A suitable Telco cable is a model number 110C5 cable which is commercially available from Lucent Technologies of Houston, Tex.

Assembly and installation of the integrated data, voice, and video communication network 30 will now be discussed. The wiring harness 56, the equipment cabinet 32, the main distribution frame 34, and the cable harness 36 are assembled at an assembly site prior to the installation of the integrated data, voice, and video communication network 30 at the installation site. What is meant herein by the term "assembly site" is a location or site where the integrated data, voice, and video communication network 30 is assembled which is remote from the installation site where the integrated data, voice, and video communication network 30 is installed and rendered operational. In particular, the equipment cabinet 32 is assembled at the assembly site by (1) bundling the individual cables which couple the various network devices together (see FIG. 6) to form the wiring harness 56, (2) mounting the wiring harness 56 in the equipment cabinet 32, (3) mounting the network devices such as the main processing system 42, the expansion processing system 43 (if installed), the network hub 44, and the additional network hubs 45 and 46 (if installed) within the equipment cabinet 32, (4) installing the desired circuit cards 92 in the main processing system 42 and the expansion processing system 43, (5) connecting the network devices to the wiring harness 56, and (6) loading the desired systems and application software onto the various network devices and configuring the same.

The main distribution frame 34 is pre-wired or otherwise assembled at the assembly site by (1) mounting the connector blocks 64 and 66 and the distribution panel 62 to the back panel 134, (2) connecting the jumper wires 70 between the distribution panel 62 and the connector blocks 66, and (3) connecting the jumper wires 68 between the connector blocks 64 and the connector blocks 66.

In addition, the cable harness 36 is assembled at the assembly site. In particular, the separate cables 140 are bundled together at the assembly site to form the cable harness 36.

After the equipment cabinet 32, the main distribution frame 34, and the cable harness 36 are assembled at the assembly site, a relatively short amount of time is necessary to install the integrated data, voice, and video communication network 30 after it is delivered to the installation site. It is assumed that installation of the data and telecommunication lines 19 has been performed prior to the installation of the equipment cabinet 32, the main distribution frame 34, and the cable harness 36 at the installation site.

When installing the integrated data, voice, and video communication network 30, the main distribution frame 34 is mounted to a wall proximate the termination of the data and telecommunication lines 19. Then, (1) the equipment cabinet 32 is positioned proximate the main distribution frame 34, (2) the display monitor 50 and the external data storage device 48 are coupled to the respective data connectors 94 and 96 and power connectors 98 and 100 of the upper distribution panel 52, (3) one end of the cable harness 36 is coupled to the connectors 138 associated with the distribution panel 62 of the main distribution frame 34, while the other end of the cable harness 36 is coupled to the connectors 110 associated with the lower distribution panel 54, and (4) the power cord 114 is coupled to a source of AC voltage.

It should be appreciated that although the equipment cabinet 32 may be positioned as close as a few feet away from the main distribution frame 34, the equipment cabinet 32 may also be positioned at a much further distance away from the main distribution frame 34 such as 100 feet. The distance between the equipment cabinet 32 and the main distribution frame 34 is only limited by the desire to prevent signal deterioration on the signal lines which connect the network devices within the equipment cabinet 32 and the workstations which communicate with the network devices. The IEEE 10BaseT Ethernet specification sets forth a preferred distance range in order to prevent such signal deterioration. In particular, the IEEE specification identifies a preferred distance to be under 300 feet.

If it later becomes desirable to do so, an additional server or additional network hubs may be easily added to the integrated data, voice, and video communication system 30 after it has been installed and rendered operational. In particular, since the wiring harness 56 is assembled at the assembly site with the necessary cables for the various devices which may later be installed in a given integrated data, voice, and video communication system 30 which was previously installed and rendered operational at the installation site, additional wiring of the equipment cabinet 32 is not needed. Therefore, only the hardware and software to support the additional devices need be added to the integrated data, voice, and video communication system 30. For example, to add an additional server, such as an Internet server, an additional circuit card 92 (see FIG. 4), along with the associated software therewith, are installed in either the main processing system 42 or the expansion processing system 43 (if installed). Moreover, to add additional LAN connections, the additional network hubs 45 and/or 46 may be installed, along with the associated software therewith, and thereafter connected with the connectors 116 in order to be rendered operational.

Thus, it should be appreciated that with the integrated data, voice, and video communication network 30, as described above, (1) no time is spent at the installation site wiring individual network devices to the main distribution frame 34 as compared with previous data, voice, and video communication networks, (2) no time is spent at the installation site loading software onto individual network devices as compared with previous data, voice, and video communication networks, (3) no time is spent at the installation site configuring individual network devices so that they are compatible with each other as compared with previous data, voice, and video communication networks, and (4) relatively little time is spent at the installation site installing additional network devices should the need arise to add additional devices as compared with previous data, voice, and video communication networks.

As can be seen in FIGS. 3–5 and 7–8, the integrated data, voice, and video communication network 30 is relatively compact compared to previous data, voice, and video communication networks. In particular, all of the network devices are compactly supported within or on the equipment cabinet 32. Moreover, the equipment cabinet 32 is aesthetically pleasing, thus the equipment cabinet 32 may be located in a visible or open area at the installation site and not hidden away from view in a back room or closet as compared with previous data, voice, and video communication networks.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, the equipment cabinet 32 may be configured so as to provide for future expansion and/or upgrades of the integrated data, voice, and video communication network 30. In particular, a facilities server may be installed in the main processing system 42 or the expansion processing system 43. The facilities server may be used for controlling a customer's heater, ventilation, and air conditioning (HVAC) system, turning selected lights at the user's premises on or off during the course of the night, or powering on or off selected machines at the user's premises. For example, a facilities server may be used to turn off a photocopying machine at the end of a business day, and then turn the photocopying machine on at the start of the next day. A suitable application software for the facilities server is Netware Nest which is commercially available from Novell.

Moreover, a security server for controlling a customer's security system may likewise be installed in the main processing system 42 or the expansion processing system 43. The security server may be used to control a number of motion detectors, door and window alarms, video cameras, and card access machines which may be located on the user's premises. As with the facilities server, Netware Nest from Novell may be used as a suitable application software for the security server.

Moreover, it should be appreciated that the cables for coupling a particular network device to some or all of the network devices associated with the equipment cabinet 32 may be included in the wiring harness 56 or may be provided as separate cables disassociated from the cable harness 56. For instance, the external data storage device 48 may be connected to a network device, such as the main processing system 42, via a SCSI cable which is included in the wiring harness 56, or the external data storage device 48 may be alternatively coupled to the main processing system 42 via a separate SCSI cable which is not included in the wiring harness 56. Similarly, the network devices, such as the display monitor 50, may be connected to the power supply 47 via power cables which are included in the wiring harness 56, or the display monitor 50 may be alternatively connected to the power supply 47 via a separate power cable which is not included in the wiring harness 56.

What is claimed is:

1. A communication network assembly, comprising:

a cabinet having a first set of connectors secured thereto;

a main processing system supported within said cabinet, said main processing system including a plurality of circuit card slots;

a network hub supported within said cabinet;

a wiring harness supported within said cabinet which connects said main processing system and said network hub to said first set of connectors, said wiring harness further connects said main processing system to said network hub;

a main distribution frame having a second set of connectors secured thereto; and a cable harness having a third set of connectors and a fourth set of connectors, said third set of connectors being connected to said first set of connectors, and said fourth set of connectors being connected to said second set of connectors.

2. The assembly of claim 1, further comprising a display monitor and an external storage device each being supported by said cabinet, wherein:

said cabinet further has a fifth set of connectors secured thereto, and said wiring harness further connects said main processing system and said network hub to said fifth set of connectors, and said display monitor and said external storage device are each connected to said fifth set of connectors.

3. The assembly of claim 2, wherein:

said first set of connectors are secured to a first distribution panel which is mounted on said cabinet, said second set of connectors are secured to a second distribution panel mounted on said main distribution frame, and said fifth set of connectors are secured to a third distribution panel which is mounted on said cabinet.

4. The assembly of claim 1, wherein:

said main processing system is slidably mounted within said cabinet, said main processing system is movable between a first position and a second position, said cabinet further has an articulating arm mounted therein, said wiring harness is supported by said articulating arm, and said articulating arm positions said wiring harness (1) at a first orientation when said main processing system is positioned at said first position, and (2) at a second orientation when said main processing system is positioned at said second position.

5. The assembly of claim 1, further comprising an uninterruptible power supply supported by said cabinet, wherein:

said wiring harness connects said uninterruptible power supply to said main processing system.

6. The assembly of claim 5, wherein said wiring harness connects said uninterruptible power supply to said fifth set of connectors.

7. The assembly of claim 1, wherein:

said main processing system includes a file and print server card located within a first slot of said plurality of circuit card slots.

8. The assembly of claim 7, wherein said main processing system further includes at least one of the following circuit cards located in a second slot of said plurality of circuit card slots:

a management console circuit card, a communications circuit card, a telephony circuit card, an Internet circuit card, an application circuit card, and a video circuit card.

9. The assembly of claim 1, wherein said main distribution frame includes:

a first connector block and a second connector block;

a first distribution panel having said second set of connectors secured thereto, a first group of wires connecting said second set of connectors to said second connector block, and a second group of wires connecting said second connector block to said first connector block.

10. The assembly of claim 1, further comprising a plurality of workstations electrically connected to said second set of connectors of said main distribution frame.

11. A communication network assembly, comprising:

a cabinet having a first set of connectors secured thereto;

a plurality of network devices supported within said cabinet, said plurality of network devices include a network hub and a main processing unit;

a wiring harness supported within said cabinet which connects said plurality of network devices to said first set of connectors, said wiring harness further connects said plurality of network devices to each other;

a main distribution frame having a second set of connectors secured thereto; and a cable harness having a third set of connectors and a fourth set of connectors, said third set of connectors being connected to said first set of connectors, and said fourth set of connectors being connected to said second set of connectors.

12. The assembly of claim 11, further comprising a display monitor and an external storage device each being supported by said cabinet, wherein:

said cabinet further has a fifth set of connectors secured thereto, and said wiring harness further connects said plurality of network devices to said fifth set of connectors, and said display monitor and said external storage device are each connected to said fifth set of connectors.

13. The assembly of claim 12, wherein:

said first set of connectors are secured to a first distribution panel which is mounted on said cabinet, said second set of connectors are secured to a second distribution panel mounted on said main distribution frame, and said fifth set of connectors are secured to a third distribution panel which is mounted on said cabinet.

14. The assembly of claim 11, wherein:

said network hub is slidably mounted within said cabinet, said network hub is movable between a first position and a second position, said cabinet further has an articulating arm mounted therein, said wiring harness is supported by said articulating arm, and said articulating arm positions said wiring harness (1) at a first orientation when said network hub is positioned at said first position, and (2) at a second orientation when said network hub is positioned at said second position.

15. The assembly of claim 11, further comprising an uninterruptible power supply supported by said cabinet, wherein:

said wiring harness connects said uninterruptible power supply to said plurality of network devices.

16. The assembly of claim 15, wherein said wiring harness connects said uninterruptible power supply to said fifth set of connectors.

17. The assembly of claim 11, wherein:

said main processing system includes a plurality of circuit card slots, and said main processing system further includes a file and print server card located within a first slot of said plurality of circuit card slots.

18. The assembly of claim 17, wherein said main processing system further includes at least one of the following circuit cards located in a second slot of said plurality of circuit card slots:

a management console circuit card, a communications circuit card, a telephony circuit card, an Internet circuit card, an application circuit card, and a video circuit card.

19. The assembly of claim 11, wherein said main distribution frame includes:

a first connector block and a second connector block;

a first distribution panel having said second set of connectors secured thereto, a first group of wires connecting said second set of connectors to said second connector block, and a second group of wires connecting said second connector block to said first connector block.

20. The assembly of claim 19, further comprising a plurality of workstations electrically connected to said first connector block of said main distribution frame.

* * * * *